(12) United States Patent
Chang et al.

(10) Patent No.: US 6,661,493 B2
(45) Date of Patent: Dec. 9, 2003

(54) ELECTRODE ARRAY STRUCTURE OF IPS-LCD

(75) Inventors: Ching Chao Chang, Taipei (TW); Sakae Tanaka, Taoyuan Hsien (TW)

(73) Assignee: Hannstar Display Corp., Taipei (TW)

( * ) Notice: Subject to any disclaimer, the term of this patent is extended or adjusted under 35 U.S.C. 154(b) by 45 days.

(21) Appl. No.: 10/121,680

(22) Filed: Apr. 15, 2002

(65) Prior Publication Data

US 2003/0095221 A1 May 22, 2003

(30) Foreign Application Priority Data

Nov. 20, 2001 (TW) ........................................ 90128749 A

(51) Int. Cl.⁷ .......................................... G02F 1/1343
(52) U.S. Cl. ........................ 349/141; 349/139; 349/38; 349/138; 349/43
(58) Field of Search ................................ 349/141, 139, 349/138, 38, 43

*Primary Examiner*—Robert H. Kim
*Assistant Examiner*—George Y. Wang
(74) *Attorney, Agent, or Firm*—Intellectual Property Solutions, Incorporated

(57) ABSTRACT

A pixel area of an in-plane switching mode LCD (IPS-LCD) device has at least two common electrodes extending along Y-axis direction and at least a pixel electrode extending along Y-axis direction, in which the pixel electrode is disposed between the two adjacent common electrodes in parallel. The common electrode and the pixel electrode have the same profile that is connected by a first strip-shaped segment, a second strip-shaped segment, a third strip-shaped segment and a fourth strip-shaped segment in sequence. The first segment is not parallel to the second segment, the first segment is not parallel to the third segment, the second segment is not parallel to the fourth segment, and the third segment is not parallel to the fourth segment.

8 Claims, 6 Drawing Sheets

ELECTRODE ARRAY STRUCTURE OF IPS-LCD

BACKGROUND OF THE INVENTION

1. Field of the Invention

The present invention relates to an In-Plane Switching mode LCD (IPS-LCD) and, more particularly, to an electrode array structure of an IPS-LCD for obtaining a smooth curve in the dark region of the Voltage-Transparency (V-T) diagram.

2. Description of the Related Art

In-plane switching mode LCD (IPS-LCD) has developed for improving the view angle of a conventional twisted nematic LCD (TN-LCD). In an in-plane switching mode LCD (IPS-LCD), common electrodes and pixel electrodes are formed on a lower glass substrate (TFT substrate) and an in-plane electric field therebetween is generated to rearrange the liquid crystal molecules along the in-plane electric field. Accordingly, the IPS-LCD has been used or suggested for improving viewing angle, contrast ratio and color shift.

Depending on designs of the electrode array structure, the IPS-LCD is classified as a single-domain type and a two-domain type. FIG. 1 is a top view showing an electrode array structure of a single-domain IPS-LCD device 10 according to the prior art. In the IPS-LCD device 10, two adjacent gate lines 2 and two adjacent data lines 4 are arranged to form an approximately rectangular-shaped pixel area, in which a TFT structure 5, a comb-shaped pixel electrode 6, and a comb-shaped common electrode 8 are disposed. The center wiring portion 8I of the common electrode 8 transversely extends to across the pixel area. The teeth 6a of the pixel electrode 6 are disposed in the intervals between the teeth 8a of the common electrode 8. When an outer voltage is applied to the IPS-LCD 10, an in-plane electric field is generated between the adjacent teeth 6a and 8a. Also, each of the teeth 6a and 8a is formed as a strip profile and in parallel to each other, thus the distribution of the electric field generated therebetween is uniform and the liquid crystal molecules can be uniformly driven at the same time. However, this needs a high driving voltage.

For improving color shift of the single-domain IPS-LCD device 10, a two-domain IPS-LCD device 20 is developed as shown in FIG. 2. In the two-domain IPS-LCD device 20, two adjacent gate lines 12 and data lines 14 are arranged in a matrix form to define a pixel area 11, in which a TFT structure 15, a comb-shaped pixel electrode 16 and a herringbone-shaped common electrode 18 are disposed. Using the center wiring portion 18a of the common electrode 18 as the discrimination, the pixel area 11 is divided into a first sub-pixel area 11a and a second sub-pixel area 11b. In the first sub-pixel area 11a, the first teeth 16a of the pixel electrode 16 and the first bones 18a of the common electrode 18 are aligned from the lower left toward the upper right. In the second sub-pixel area 11b, the second teeth 16a and the second bones 18a are aligned from the upper left toward the lower right. When an external voltage is applied to the IPS-LCD device 20, the liquid crystal molecules positioned in different sub-pixel areas 11a and 11b respectively rotate in counterclockwise direction and in clockwise direction.

In addition, a multi-domain IPS-LCD device 20' is developed as shown in FIG. 3. The tooth of the pixel electrode 16 is formed as a continuous saw-toothed profile extending along lengthwise direction, and the bone of the common electrode 18 is formed as a continuous saw-toothed profile extending along lengthwise direction. For example, as to the pixel electrode 16, the first tooth 16a in the first sub-pixel area 11a is parallel to the third tooth 16c in the second sub-pixel area 11b, and the inclination of the teeth 16a and 16c is θ. Similarly, the second tooth 16b and the fourth tooth 16c are in parallel to each other. As to the common electrode 18, the first bone 18a in the first sub-pixel area 11a is parallel to the third bone 18c in the second sub-pixel area 11b, and the inclination of the bones 18a and 18c is θ. Similarly, the second bone 18b and the fourth bone 18c are in parallel to each other. However, in the electrode array structure of the IPS-LCD device 20', a steep curve is found in the dark region of a Voltage-Transparency (V-T) diagram. This is difficult to subdivide the gray scale.

SUMMARY OF THE INVENTION

The present invention provides an electrode array structure of a multi-domain IPS-LCD to solve afore-mentioned problems.

In in-plane switching mode LCD (IPS-LCD) device, each pixel area of an has at least two common electrodes extending along Y-axis direction and at least a pixel electrode extending along Y-axis direction, in which the pixel electrode is disposed between the two adjacent common electrodes in parallel. The common electrode and the pixel electrode have the same profile that is connected by a first strip-shaped segment, a second strip-shaped segment, a third strip-shaped segment and a fourth strip-shaped segment in sequence. The first segment is not parallel to the second segment, the first segment is not parallel to the third segment, the second segment is not parallel to the fourth segment, and the third segment is not parallel to the fourth segment.

Accordingly, it is a principal object of the invention to provide an electrode array structure to achieve a multi-domain IPS-LCD.

It is another object of the invention to provide the common electrode and the pixel electrode with the continuous saw-toothed profile.

Yet another object of the invention is to provide the common electrode formed by connecting four segments that are not parallel to each other.

It is a further object of the invention to obtain a smooth-tending curve in the dark region of V-T diagram.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention provides a multi-domain IPS-LCD device with a novel electrode array structure. In each pixel area, a plurality of pixel electrodes is formed in the intervals of a plurality of common electrodes and parallel to each other. The pixel electrode and the common electrode have the same profile that is connected by four strip-shaped segments. The first segment is not parallel to the second segment, the first segment is not parallel to the third segment, the second segment is not parallel to the fourth segment, and the third segment is not parallel to the fourth segment. Also, each of the four segments has a specific inclination from the X-axis along counterclockwise direction to obtain a smooth-tending curve in the dark region of V-T diagram.

Figure 1:
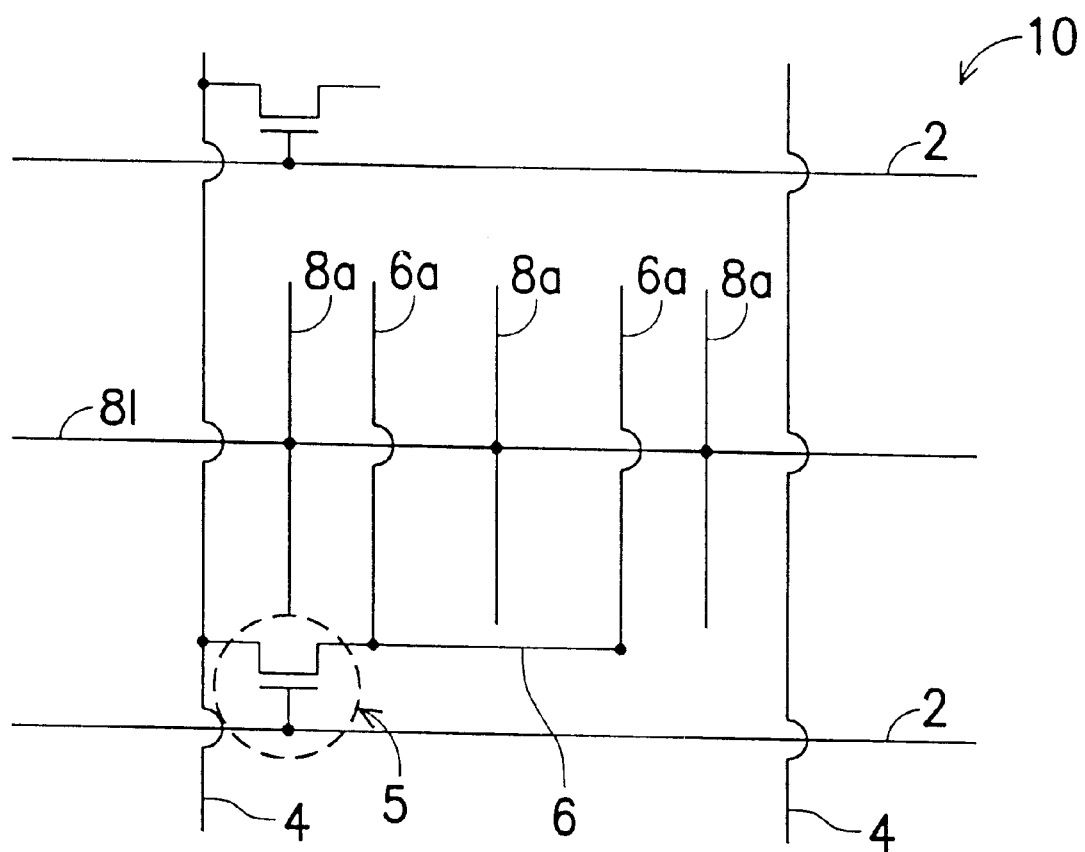
FIG. 1 is a top view showing a single-domain IPS-LCD device according to the prior art.
Figure 2:
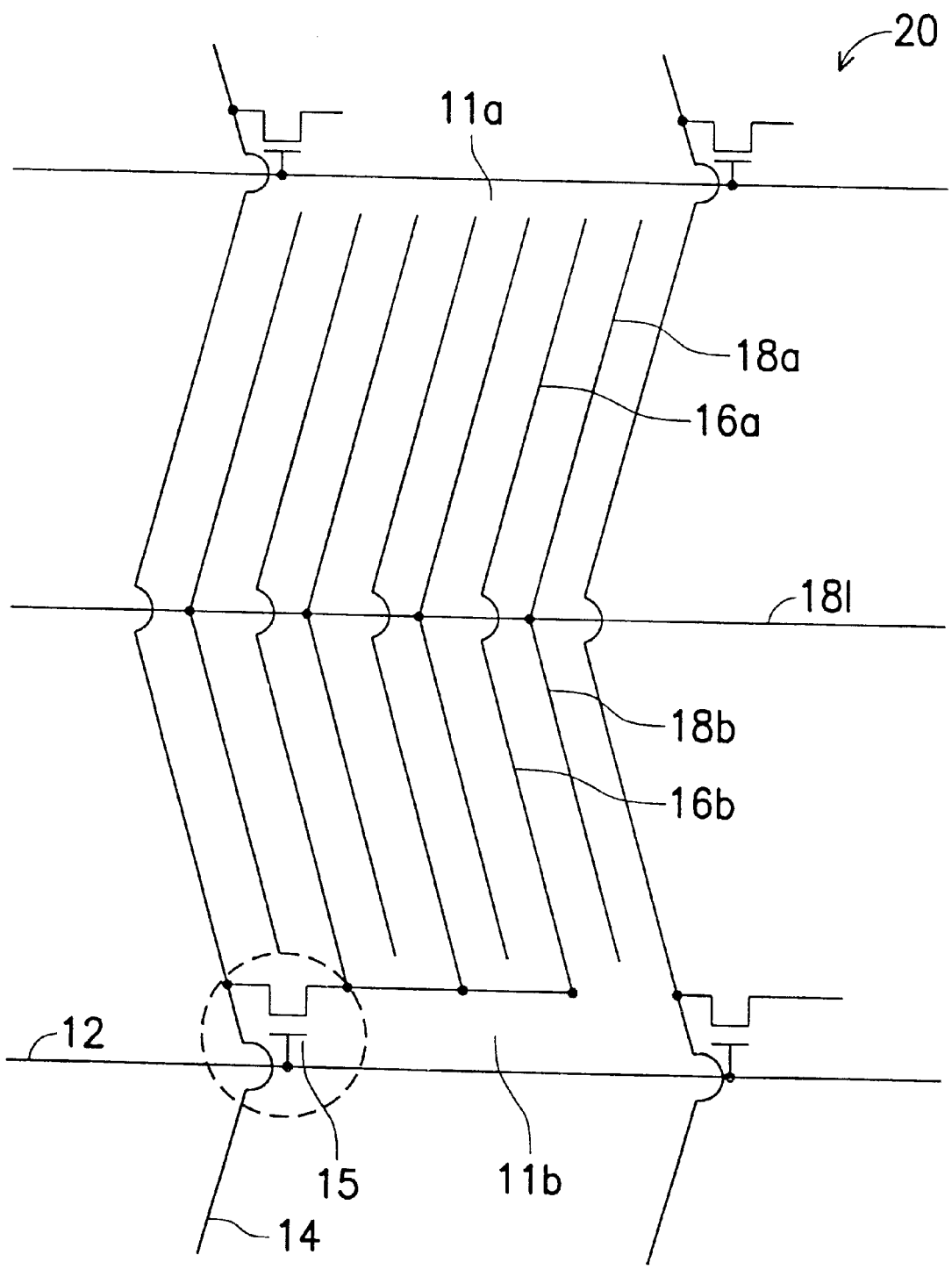
FIG. 2 is a top view showing a two-domain IPS-LCD device according to the prior art.
Figure 3:
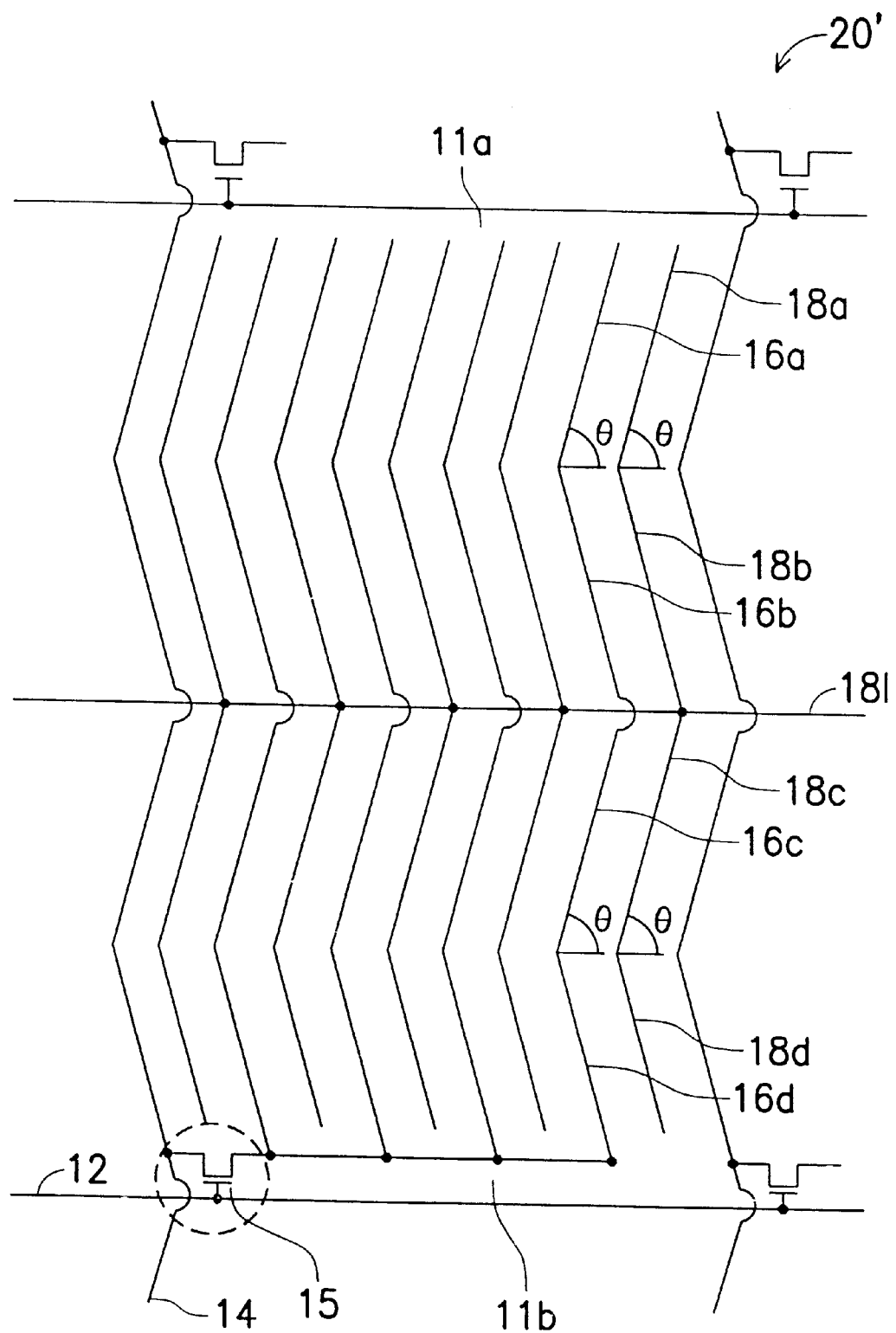
FIG. 3 is a top view showing a multi-domain IPS-LCD device according to the prior art.
Figure 4:
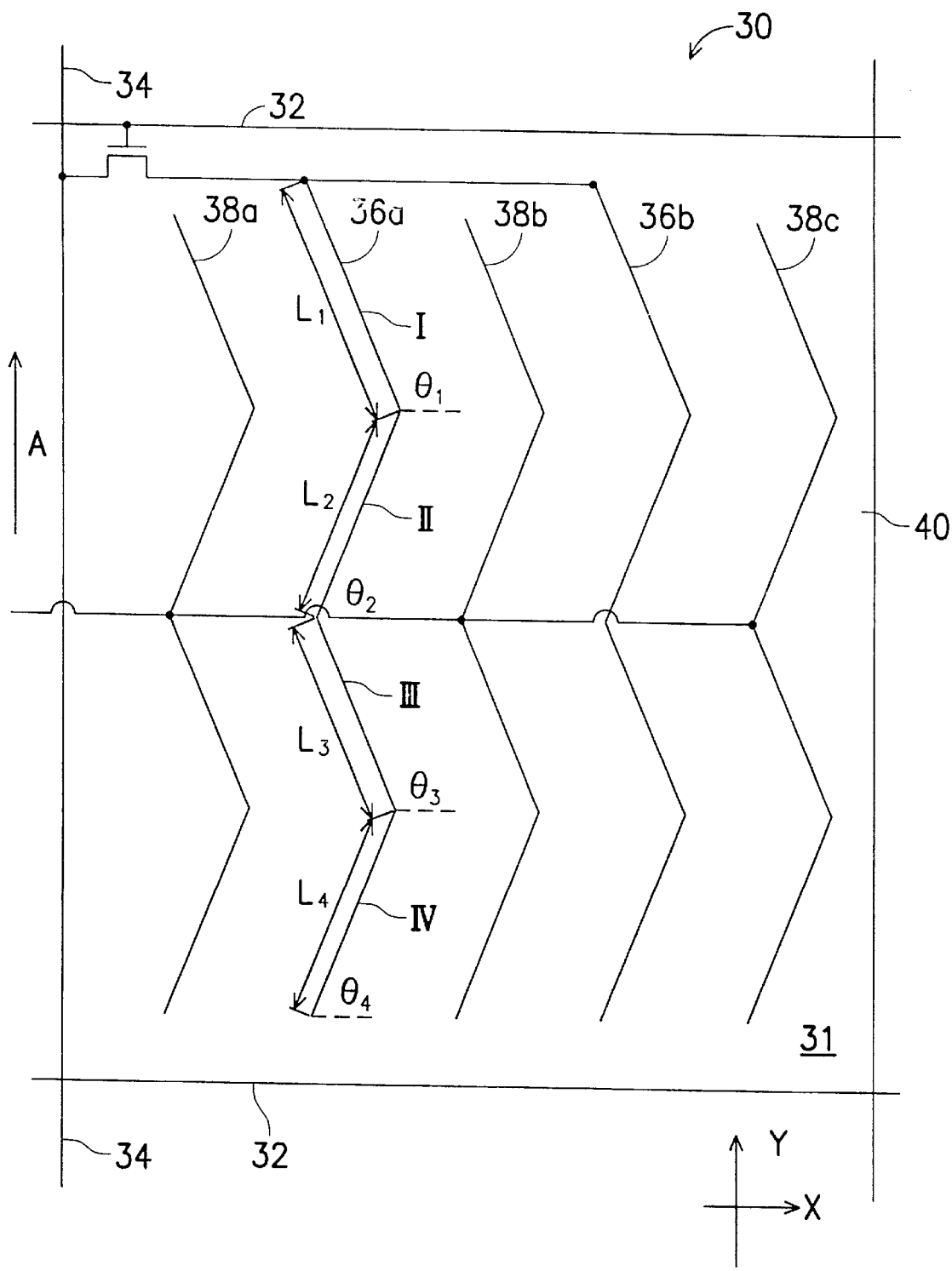
FIG. 4 is a top view showing an electrode array structure of an IPS-LCD device according to the present invention.

FIG. 4 is a top view showing an electrode array structure of an IPS-LCD 30 according to the present invention. In the IPS-LCD device 30, a plurality of gate lines 32 extending along X-axis direction and a plurality of data lines 34 extending along Y-axis direction are arranged in a matrix form to define rectangular pixel areas 31. Each pixel area 31 has at least a pixel electrode 36 extending along Y-axis direction and at least two common electrodes 38 extending along Y-axis direction, and the pixel electrode 36 formed between the two common electrodes 38 are parallel to each other. As shown in FIG. 4, two pixel electrodes 36a and 36b are disposed between three common electrodes 38a, 38b and 38c in parallel, and the pixel electrodes 36 and the common electrodes 38 have the same profile that is connected by a first strip-shaped segment I, a second strip-shaped segment II, a third strip-shaped segment III and a fourth strip-shaped segment IV in sequence. Thus, the profile of the pixel electrodes 36 and the common electrodes 38 is continuous saw-toothed shape. Also, the data line 32 can have the same profile with the adjacent common electrode 38. In addition, an orientation film 40 is formed to cover the pixel area 31, and is rubbed in a direction shown by arrow A. Before an external voltage is applied to the IPS-LCD device 20, the liquid crystal molecules are aligned along the direction shown by arrow A.

It is noticed that the inclined angles $\theta_1$, $\theta_2$, $\theta_3$ and $\theta_4$ of the segments I, II, III and IV from the X-axis along counterclockwise direction satisfy the formulas: first, each of $\theta_1$, $\theta_2$, $\theta_3$ and $\theta_4$ is between 60° and 85° or between 95° and 120°; second, $\theta_2+\theta_3=180°$; third, $\theta_1+\theta_4=180°$; fourth, $\theta_{1,4}\neq\theta_{2,3}$, and $\theta_{1,4+\theta 2,3}\neq 180°$. Also, the lengths $L_1$, $L_2$, $L_3$ and $L_4$ of the segments I, II, III and IV satisfy one of the formulas: first, $L_1=L_2=L_3=L_4$; second, Max($L_1$, $L_2$, $L_3$, $L_4$)/Min($L_1$, $L_2$, $L_3$, $L_4$)$\leq 4$. For example, $L_1:L_2:L_3:L_4=$ 1:2:2:1 or 1:1:1:1 or 4:1:1:4 or 1:4:4:1. By experimental proof, this design of the electrode array structure can obtain a smooth curve in the dark region of a Voltage-Transparency (V-T) diagram, thus the gray scale is easily subdivided.

Figure 5A:
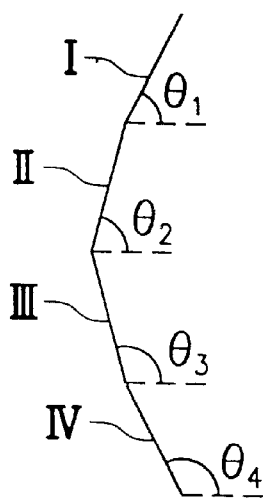
FIGS. 5A to 5C are schematic diagrams showing preferred embodiments according to the present invention.
Figure 5B:
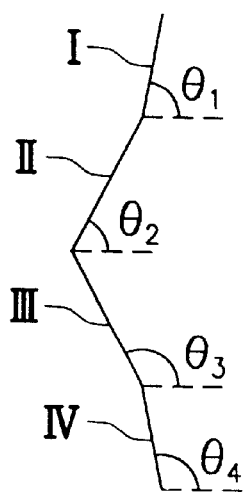
Figure 5C:
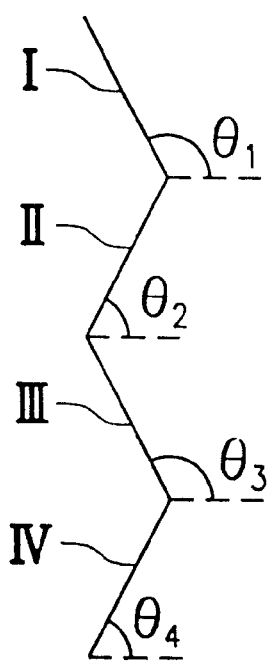

According to the formulas of $\theta_1$, $\theta_2$, $\theta_3$ and $\theta_4$, the profile of the pixel electrode 36 and common electrode 38 can be formed as various shapes. FIGS. 5A to 5C are schematic diagrams showing preferred embodiments according to the present invention. In the first preferred embodiment, as shown in FIG. 5A, $\theta_1=70°$, $\theta_2=80°$, $\theta_3=100°$ and $\theta_4=110°$. In the second preferred embodiment, as shown in FIG. 5B, $\theta_1=80°$, $\theta_2=70°$, $\theta_3=110°$ and $\theta_4=100°$. In the third preferred embodiment, as shown in FIG. 5C, $\theta_1=100°$, $\theta_2=70°$, $\theta_3=110°$ and $\theta_4=80°$.

It is to be understood that the present invention is not limited to the embodiments described above, but encompasses any and all embodiments within the scope of the following claims.

What is claimed is:

1. An in-plane switching mode LCD (IPS-LCD) device having a plurality of pixel areas, each pixel area comprising:

at least two common electrodes extending along Y-axis direction, wherein each common electrode is connected by a first strip-shaped segment, a second strip-shaped segment, a third strip-shaped segment and a fourth strip-shaped segment in sequence; and at least a pixel electrode extending along Y-axis direction and disposed between two adjacent common electrodes in parallel, wherein the pixel electrode has the same profile with the common electrode;

wherein, the first segment is not parallel to the second segment, the first segment is not parallel to the third segment, the second segment is not parallel to the fourth segment, and the third segment is not parallel to the fourth segment.

2. The IPS-LCD device according to claim 1, wherein the number of the common electrodes is one more than the number of the pixel electrodes in each pixel area.

3. The IPS-LCD device according to claim 1, further comprising a plurality of gate lines extending along X-axis direction and a plurality of data lines extending along Y-axis direction, which are arranged in a matrix form to form the pixel areas.

4. The IPS-LCD according to claim 3, wherein the data line has the same profile with the common electrode.

5. The IPS-LCD device according to claim 1, further comprising an orientation film formed on the pixel area and rubbed along Y-axis direction.

6. The IPS-LCD device according to claim 1, wherein the inclined angle of the first segment from the X-axis along counterclockwise is $\theta_1$, the inclined angle of the second segment from the X-axis along counterclockwise is $\theta_2$, the inclined angle of the third segment from the X-axis along counterclockwise is $\theta_3$, the inclined angle of the fourth segment from the X-axis along counterclockwise is $\theta_4$, and $\theta_1$, $\theta_2$, $\theta_3$, $\theta_4$ satisfy the formulas comprising:

(a) $60°\leq\theta_1, \theta_2, \theta_3, \theta_4\leq 85°$, or $95°\leq\theta_1, \theta_2, \theta_3, \theta_4\leq 120°$;

(b) $\theta_2+\theta_3=180°$;

(c) $\theta_1+\theta_4=180°$; and (d) $\theta_{1,4}\neq\theta_{2,3}$ or $\theta_{1,4}+\theta_{2,3}\neq 180°$.

7. The IPS-LCD device according to claim 1, wherein the length of the first segment is $L_1$, the length of the second segment is $L_2$, the length of the third segment is $L_3$, the length of the fourth segment is $L_4$, and $L_1$, $L_2$, $L_3$, $L_4$, satisfy the formula: $L_1=L_2=L_3=L_4$.

8. The IPS-LCD device according to claim 1, wherein the length of the first segment is $L_1$, the length of the second segment is $L_2$, the length of the third segment is $L_3$, the length of the fourth segment is $L_4$, and $L_1$, $L_2$, $L_3$, $L_4$, satisfy the formula: Max($L_1$, $L_2$, $L_3$, $L_4$)/Min($L_1$, $L_2$, $L_3$, $L_4$)$\leq 4$.

* * * * *